(12) United States Patent
Beardsworth et al.

(10) Patent No.: US 11,539,774 B2
(45) Date of Patent: Dec. 27, 2022

(54) SECURE, IMMUTABLE AND VERIFIABLE INTERVIEW RECORDS

(71) Applicant: Issured Limited, London (GB)

(72) Inventors: David Beardsworth, London (GB); Jeddiah Stone, London (GB); Jonathan Empson, London (GB)

(73) Assignee: Issured Limited, London (GB)

( * ) Notice: Subject to any disclaimer, the term of this patent is extended or adjusted under 35 U.S.C. 154(b) by 0 days.

(21) Appl. No.: 17/118,032

(22) Filed: Dec. 10, 2020

(65) Prior Publication Data

US 2021/0185106 A1 Jun. 17, 2021

(30) Foreign Application Priority Data

Dec. 12, 2019 (GB) ..................................... 1918314
Nov. 13, 2020 (EP) ..................................... 20207550

(51) Int. Cl.
| | |
|---|---|
| *H04L 65/70* | (2022.01) |
| *G06F 16/953* | (2019.01) |
| *G06F 16/957* | (2019.01) |
| *H04L 9/06* | (2006.01) |
| *H04L 65/65* | (2022.01) |
| *H04L 9/00* | (2022.01) |

(52) U.S. Cl.
CPC ............ *H04L 65/70* (2022.05); *G06F 16/953* (2019.01); *G06F 16/957* (2019.01); *H04L 9/0643* (2013.01); *H04L 65/65* (2022.05); *H04L 9/50* (2022.05)

(58) Field of Classification Search
None
See application file for complete search history.

(56) References Cited

U.S. PATENT DOCUMENTS

| | | | | |
|---|---|---|---|---|
| 9,549,152 | B1* | 1/2017 | Nayyar | ................ H04L 65/403 |
| 9,749,367 | B1* | 8/2017 | Kirby | ................... G06Q 10/101 |
| 10,708,322 | B1* | 7/2020 | Carlson | .................. H04L 51/58 |
| 2014/0280602 | A1* | 9/2014 | Quatrano | ............... H04W 4/08 |
| | | | | 709/205 |
| 2014/0280876 | A1* | 9/2014 | Wiklund | .............. H04L 65/765 |
| | | | | 709/224 |

(Continued)

FOREIGN PATENT DOCUMENTS

WO 2019/098895 A1 5/2019

OTHER PUBLICATIONS

Search Report for European Application No. 20207550.3 dated Apr. 26, 2021, 6 pages.

*Primary Examiner* — Dhairya A Patel

(57) ABSTRACT

A method of creating an immutable digital record of a video conference conducted over the Internet and involving two or more parties is provided. The method comprises: routing conference data through one or more servers; identifying data streams of the conference data, including video and audio streams uploaded by respective parties; separately processing the audio streams to convert speech data to text data thereby providing a text record for each party; storing the data streams and the text records at said server or servers, or at a storage medium associated with server or servers; and generating a hash value across the data streams and the text records and saving the hash value to a Blockchain ledger.

3 Claims, 5 Drawing Sheets

(56) References Cited

U.S. PATENT DOCUMENTS

| | | | |
|---|---|---|---|
| 2015/0281234 A1* | 10/2015 | Sylvain | G06F 21/31 |
| | | | 726/1 |
| 2016/0117762 A1* | 4/2016 | Ahmad | G06Q 50/12 |
| | | | 705/15 |
| 2016/0227161 A1* | 8/2016 | Jing | H04L 65/1046 |
| 2018/0124140 A1* | 5/2018 | Jiang | H04L 65/1069 |
| 2019/0289046 A1 | 9/2019 | Weber et al. | |
| 2019/0296927 A1* | 9/2019 | Klein | H04L 12/1818 |
| 2019/0317748 A1* | 10/2019 | Dawson | G06N 20/00 |
| 2020/0118569 A1* | 4/2020 | Xiao | H04M 3/42221 |
| 2021/0067344 A1* | 3/2021 | Drake | H04L 9/0643 |
| 2021/0103873 A1* | 4/2021 | Zeng | H04L 9/3247 |
| 2021/0120051 A1* | 4/2021 | Klaghofer | H04L 12/1813 |
| 2021/0203486 A1* | 7/2021 | Kilburn | H04L 65/1069 |
| 2021/0352121 A1* | 11/2021 | Ramala | H04L 65/403 |
| 2022/0070241 A1* | 3/2022 | Yerli | H04L 65/4053 |

* cited by examiner

SECURE, IMMUTABLE AND VERIFIABLE INTERVIEW RECORDS

CROSS-REFERENCE TO RELATED APPLICATIONS

This application is based on and claims priority to and benefits of United Kingdom Patent Application No. 1918314.4 filed on Dec. 12, 2019, and European Patent Application No. 20207550.3 filed on Nov. 13, 2020. The entire contents of the above-identified applications are incorporated herein by reference in their entirety.

TECHNICAL FIELD

The present invention relates to the provision of secure, immutable and verifiable interview records.

BACKGROUND

The video recording of interviews, hearings, etc. is commonplace for many purposes, especially in the legal and criminal justice field. It is of course relatively straightforward to store data extracted from the recording device for evidential purposes on a tape, hard drive or other physical media.

More recently it has become usual to conduct interviews and hearings using online video conferencing platforms such as Zoom™ and Microsoft Teams™. However, whilst such platforms can facilitate recordings, these are unlikely to provide high levels of security and immutability. The majority of available platforms require the need to log on to the proprietary platforms. Recording is provided but not with immutability of the records such as can be used to support law enforcement-based records that can be used as evidence for legal cases. Existing platforms cannot easily be defended in terms of the unique time, date, and content contained at the time of recording and with definable provenance. This means that considerable investigatory work will be required to qualify the content and to ascertain its authenticity and even with that immutability may not be possible.

The need to download or select a link on existing platforms leaves the connectivity vulnerable and existing use cases do not consider the need for evidential based standards. Delivering remote interviews to interviewees often leaves the interviewee wondering if anything has been left on their devices and or does not necessarily provide a sufficient level of reassurance if using a publicly available platform that has negative media coverage in terms of security. In addition, known approaches open up the possibility of "victim abuse" as interviewees may be able to record and share interviews, e.g. using social media platforms.

SUMMARY

According to a first aspect of the present invention there is provided a method of creating an immutable digital record of a video conference conducted over the Internet and involving two or more parties. The method comprises:
a) routing conference data through one or more servers;
b) identifying data streams of the conference data, including video and audio streams uploaded by respective parties;
c) separately processing the audio streams to convert speech data to text data thereby providing a text record for each party;
d) storing the data streams and the text records at said server or servers, or at a storage medium associated with server or servers; and
e) generating a hash value across the data streams and the text records and saving the hash value to a Blockchain ledger.

According to a further aspect of the present invention there is provided a secure, platform agnostic, interview platform that enables immutability of the interview and all its components for evidential purposes using blockchain as a digital Media evidence seal.

Agnostic here means that it only needs a web browser for its use. Immutable means that the complete interview record is hashed and entered to blockchain to provide a record that cannot be challenged in terms of its hash value in the future. The digital media evidence/intelligence seal means that any media can be provided with a digital evidence seal once presented.

The agnostic platform may be facilitated using the web browser to access Microsoft Azure™ services and requires no software download to be used.

The complete interview record may include all chat, video, screen presentations, attachments, and voice to text transcripts.

The interview record and chat may use Vonage™ (previously Tokbox™) and the developed APIs.

Audio (voice) to text conversion may use Microsoft Azure™ speech to text conversion.

Immutability may be achieved using a unique hash value that is generated using SHA256 and written to AWS Hyperledger with a unique entry reference.

The record date and time it was created, and the content is unique referenced to a certified bit stream and blockchain reference.

Formal validation may mean the presentation of media that has a certificate provided that can be re-presented to the validation tool, for checking that it has not been changed.

Media may mean any digital data recorded in any format, pictures files in any format, streams of data in any format, voice recordings, text files in any format, email, screen shots.

The unique SHA 256 reference may mean a stream of bits that represented the media presented.

The unique AWS Ledger reference may mean that, after the SHA256 has been created, it is written to the blockchain and a blockchain reference provided associated with the Hash.

Evidential/intelligence purposes may mean that the immutable record has a unique reference created that can be used for formal validation and referencing for materials used for digital evidence/intelligence and has two parts; a hash value and blockchain record reference.

Secure may mean an encrypted AES 256 link protecting the video stream in and out of the Azure tenancy using the Video streaming service.

Using blockchain may indicate the new process for which this capability applies and enables the whole immutable record.

'Digital evidence/intelligence seal' may indicate the new process approach for law enforcement, judiciary, forensics for which a hash and blockchain provides the digital evidence seal for the whole immutable record.

'Digital evidence seal' indicates the process of presenting media files.

Media may mean all digital data types that can be presented to be hashed.

Digital media may be provided with a digital evidence seal once presented to the Fuse application capability.

DETAILED DESCRIPTION

The method and system described here involves the use and integration of secure hash algorithms, blockchain technology and platform agnostic web-based video conferencing protocols to provide an immutable video interview record or digital diary record. In particular, an immutable approach is proposed that uses Hyperledger Fabric Blockchain and SHA256 to provide a unique reference to meet high digital evidence immutability requirements. In addition, the system and method use 'use cases' developed to inform the functionality in terms of use and presentation of materials to meet a law enforcement and formal record keeping environment for secure interviews, with only the need for a web browser on end user devices. The desire to be infrastructure agonistic is an area that is proposed because it removes the risk of an interviewee claiming that there has been anything installed on their devices along with enabling a download of an interview record only to the device and not using direct APIs.

The writing of the SHA256 hash to the blockchain and using these two digital records to indicate immutability is key to the design. This enables the submission of records to the component that provides the hash and blockchain reference certificate.

The use cases for which this capability has been designed are large, although areas of particular interest are law enforcement, social care and the insurance industry, where there is a particular need for immutability of a video record. This is provided using blockchain technology that is more commonly used in the financial arena.

Figure 1:
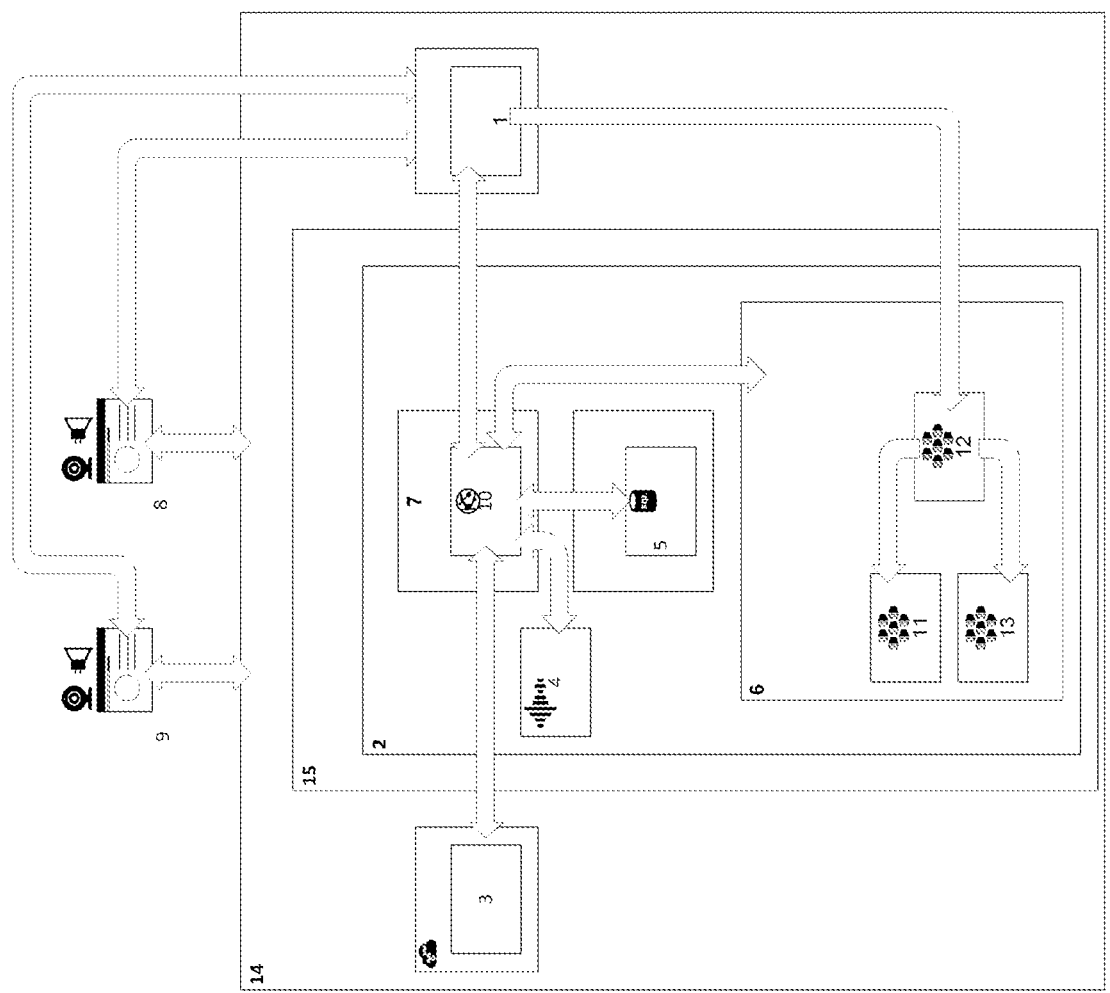
FIG. 1 illustrates schematically a system facilitating the end to end capability for a video interview.

FIG. 1 illustrates schematically a system facilitating the end to end capability for a video interview, including the following functional entities and interactions, with reference numeral indicated:

A video WEB RTC capability 1 that provides the video services.

An application instance resource group 2.

Hyperledger Fabric blockchain connectivity 3.

Microsoft Azure™ voice to text services 4 that are used for transcription of voice.

SQL database services 5 used for the application.

Individual client storage 6 be separated to ensure that each client has a secure area that only they can access.

Application services 7.

Interaction by the interviewer and the interviewee 8, 9 (using a web browser only and thereby avoiding the need for any download to the parties' devices).

Web application hosting 10.

File share 12 separating out different client data to the correct client store.

Separation of different client data stores 11, 13.

Application instance 14 for the capability.

Instance resource group 15.

In an exemplary embodiment, the interviewer 8 uses his or her device to log on to an account established with a service provider over the Internet, using a standard web browser such as Google Chrome™. The interviewer sets up the interview and obtains a unique interview URL. This can be sent to the interviewee, e.g. in an email or calendar invitation. At the allocated time, both the interviewer and the interviewee access the interview video conference via their web browsers, but the interviewer must accept the interviewee into the interview.

As already noted conventional web-based video conferencing platforms often provide a recording feature. However, these recordings tend to be a single mixed video and audio recording. This does not easily enable voice transcription and transcription is conducted post the interview. The present proposal therefore records voice and video streams of the participants separately and in real time, thereby allowing the voice streams to be transcripted separately and attributed to the correct speaker. This enables capabilities, such as language translation by video stream in real time. The separately recorded video and audio streams are saved as a bundle in the appropriate client domain store, and can be accessed subsequently only with the necessary access credentials. The records may be encrypted to prevent unauthorised access. All stored data is encrypted at rest (i.e. while data is sitting in the store waiting to be accessed) and each video stream is encrypted.

In order to allow the recorded interview data to be verified at a later time, immediately following the recording of the data, a SHA256 hash is created over the recorded video data. The service then writes the hash to a blockchain service, e.g. the Hyperledger Fabric blockchain. Note that the recorded data itself is not stored in the blockchain, only the hash. A unique identifier ("blockchain reference") is created as part of this process, and acts as a pointer to the blockchain record. The pointer is stored together with the recorded interview data in the client store.

Figure 2:
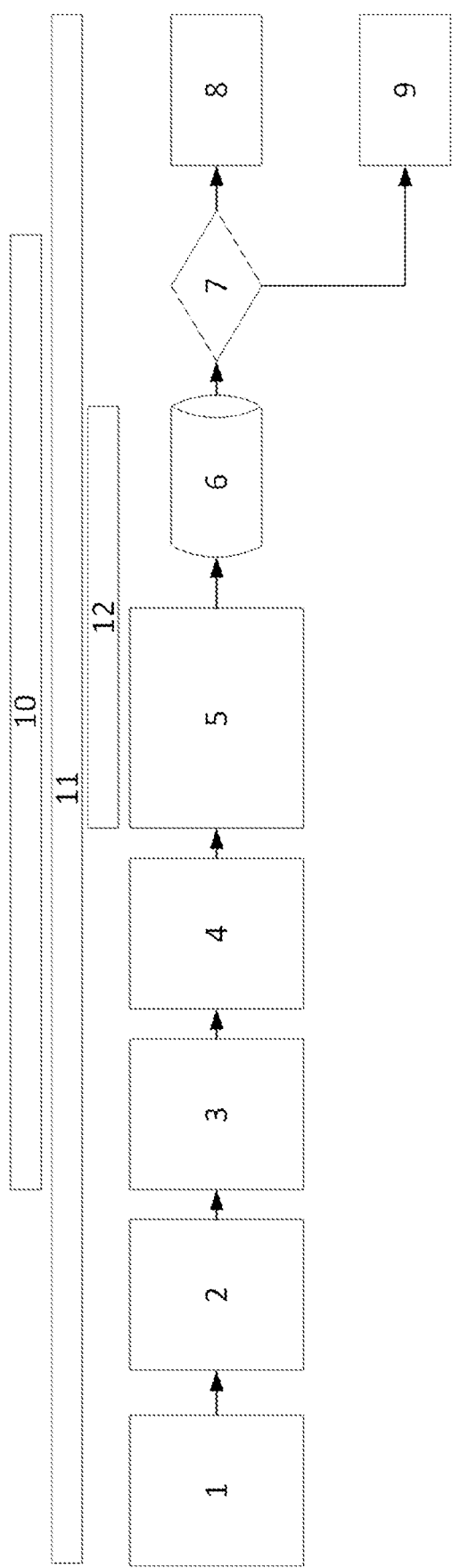
FIG. 2 illustrates schematically a service for subsequently validating a previously stored interview record.

FIG. 2 illustrates schematically a service for subsequently validating a previously stored interview record, and including the following functions and interactions, with reference numbers indicated:

A local media file to be accessed is selected from the local data store, ready for it to be uploaded for validation against its unique hash and blockchain reference, 1.

The original reference number as attached is used for the validation of the record and is entered at this point, 2.

The Unique reference number for comparison, 3.

A new hash for the selected file is generated, 4.

Using the transaction ID, the original hash is retrieved from the Blockchain and is compared with the newly generated hash, 5.

The distributed block chain ledger, 6.

The assessment of the comparison to be made, resulting in results 8 or 9 depending on whether the validation is correct or not.

The SQL services, 10.

The Web application services, 11.

The block chain services, 12.

Figure 3:
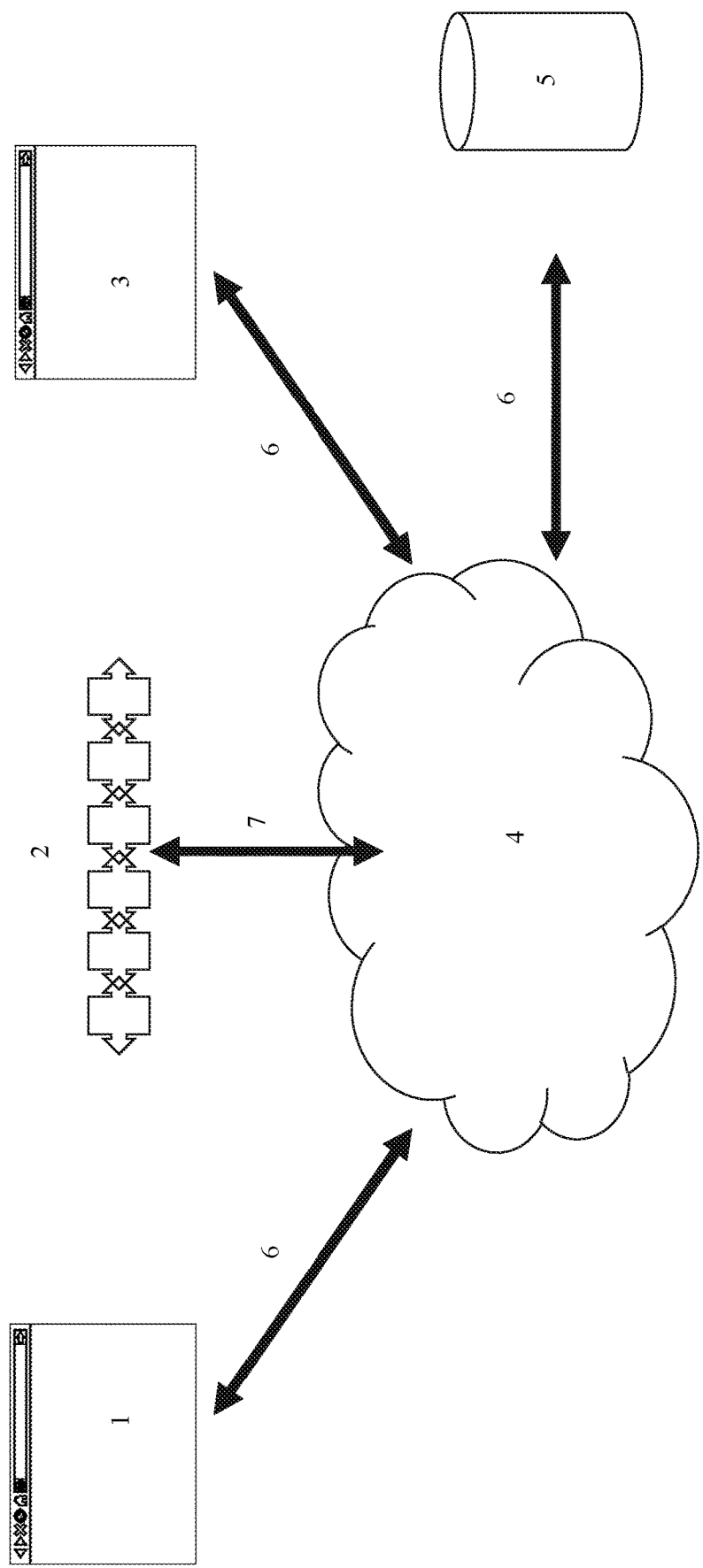
FIG. 3 provides an overview of a proposed secure video interview procedure.

FIG. 3 provides an overview of the proposed approach being taken.

The witness or other interviewee accesses the service, 1, using a web browser.

The reference to the blockchain being presented by the MSAzure services, 2.

The interviewer accesses the service, 3, using a web browser.

The MSAzure cloud service and the temporary storage location of all media during the video interview, 4.

Local storage of the interviewer's own private networks and long-term store as required, 5.

Encrypted links 6 between each service that makes the service secure.

The hash of the completed video interview being written to the blockchain for immutability, 7.

By way of further clarification and explanation, the following processes for recording and accessing interview data are described. These processes are overlapping with those already described above with reference to FIGS. 1 to 3.

Considering firstly FIG. 4, this again illustrates a process/system for establishing and immutably recording an interview. The system/process rely upon SQL database services and appropriate Web Apps. These are illustrated as process layers in the drawing. Many of the entities/process steps shown in the drawing will be self-explanatory, and only certain steps will now be described.

As a first step 1, an interviewer creates an interview/meeting (typically before the start time of the interview/meeting). At 2, the interviewer invites the interviewee, e.g. by sending an interview link in an email or calendar event. At 3, the interviewee connects to the interview using the link and at 4 the Interviewee validates the interviewee and enters the interview. The secure interview then commences at 5. This involves the Web RTC conference 6 with audio and video streams, enabled by the Web RTC service 12. Speech to text conversion 7 is performed on the separate audio streams using a speech to text cloud service 13. Document sharing 8 and instant messaging 9 are also enabled. The audio and video streams, and the text files, are provided to the client data set 19 in the consumed storage services 20.

The interview ends at 14, whereupon at 15 the blockchain hash is generated across all of the data stored in the client data set. This hash is added to the complete data set, and is also sent to the blockchain. Other management data may also be added to the packaged file.

Figure 4:
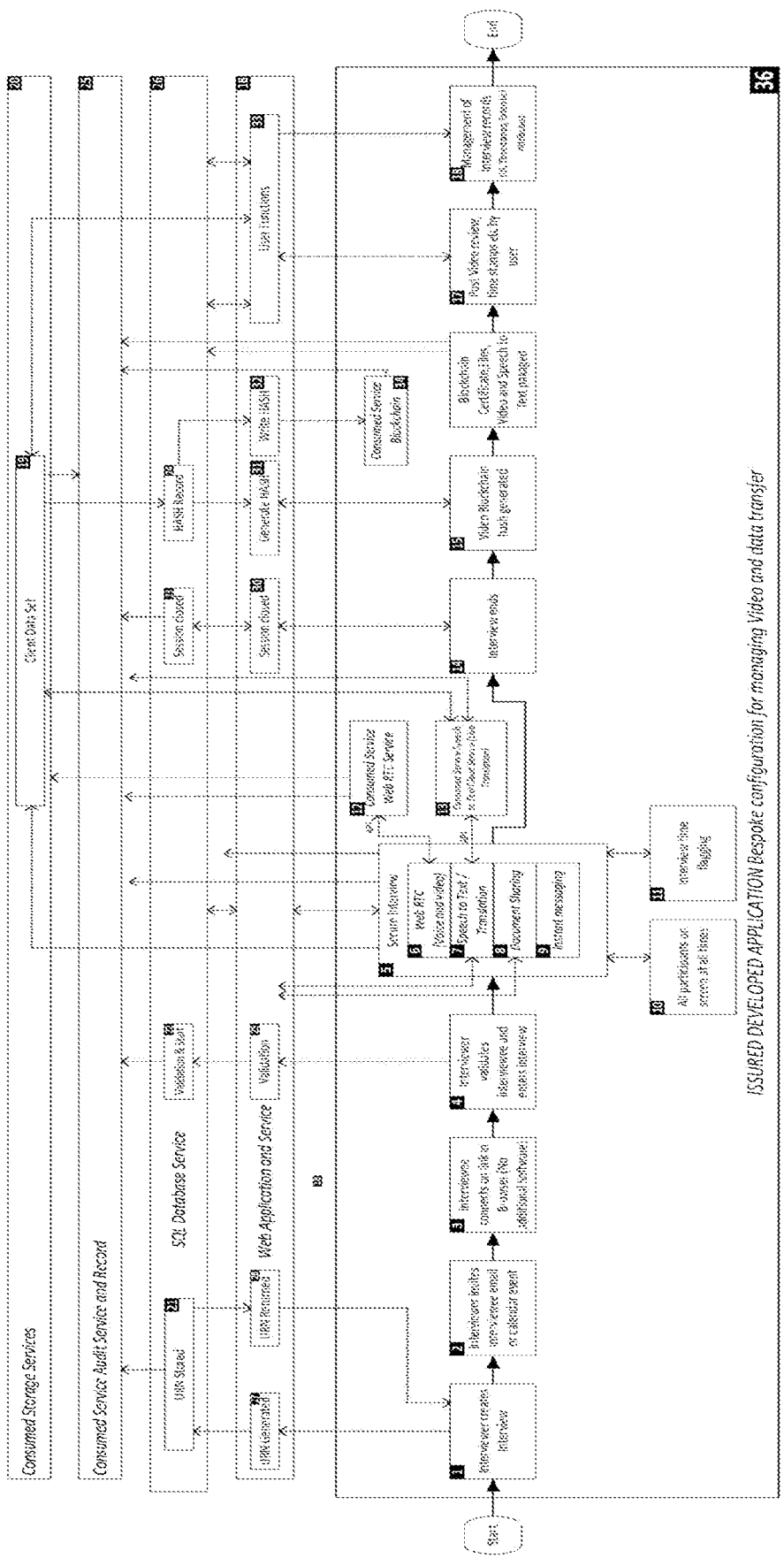
FIG. 4 illustrates a process/system for establishing and immutably recording an interview.
Figure 5:
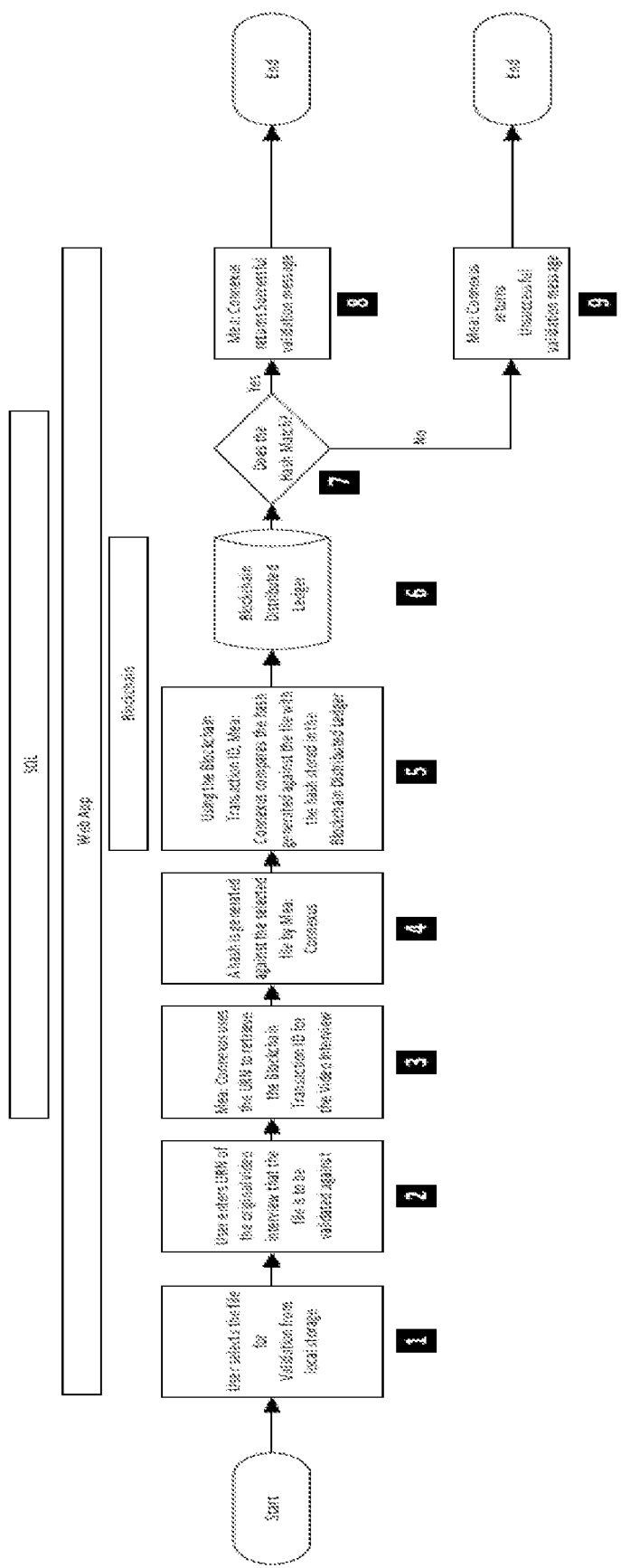
FIG. 5 illustrates a process/system for securely accessing data stored using the process/system of FIG. 4.

FIG. 5 illustrates a process/system for securely accessing data stored using the process/system of FIG. 4. Firstly, at 1, a user selects the file that requires validation from the local storage. This assumes that the user has accessed the local storage using appropriate authorization credentials. At 2, the user enters the URN of the original video interview that the file is to be validated against. Then, at 3, the service uses the URN to retrieve the Blockchain transaction ID for the video interview. At 4, a hash is generated over the file that the user has selected and that is to be validated. At 5, the service uses the Blockchain Transaction ID to retrieve 6 from the Blockchain ledger the previously saved hash. This retrieved hash is then compared at 7 with the newly generated hash. If the hash match is successful, the service returns at 8 an indication of successful validation. If the match is unsuccessful, the service returns at 9 an indication of the failure of the match.

It will be appreciated by the person of skill in the art that various modifications may be made to the above described embodiments without departing from the scope of the invention.

The invention claimed is:

1. A method of creating an immutable digital record of a video interview conducted over the Internet and involving two or more parties, the method comprising:
    a) initiating, establishing, and performing a video conference for the video interview using a WebRTC platform, wherein the two or more parties in the video interview access the video conference using web browsers running on respective computer devices, wherein the video conference is enabled by the WebRTC platform;
    b) extracting conference data of the video conference and routing the conference data out from the WebRTC platform to one or more servers of a cloud computing service, wherein the one or more servers of the cloud computing service are external to the WebRTC platform;
    at the cloud computing service,
    c) identifying data streams of the conference data including video streams and audio streams, attributing the data streams to each party, and separating the video streams and the audio streams;
    d) processing the audio streams to convert speech data to text data in real time at the video conference for providing a text record for each party, and attributing the text record to each party;
    e) storing the data streams and text records at the one or more servers, or at a storage medium associated with the one or more servers; and
    f) generating a hash value across the data streams and the text records and uploading the hash value to a distributed Blockchain ledger,
    wherein uploading the hash value to the distributed Blockchain ledger comprises generating a Blockchain transaction identifier, and the method further comprises saving the Blockchain transaction identifier together with the data streams and the text records in a secure local storage medium.

2. The method according to claim 1, wherein the data streams include chat streams and/or other messaging streams.

3. The method according to claim 1, wherein the data streams are encrypted end-to-end during the video interview.

* * * * *